(12) United States Patent
Freudelsperger (10) Patent No.: US 8,682,476 B2
(45) Date of Patent: Mar. 25, 2014

(54) PROCESS AND DEVICE FOR COMMISSIONING INDIVIDUALLY PACKAGED PRODUCTS WITH AN AUTOMATIC COMMISSIONING UNIT AND A CO-ORDINATE FLOW SHELF

(75) Inventor: Karl Freudelsperger, Hart bei Graz (AT)

(73) Assignee: Knapp AG, Hart bei Graz (AT)

( * ) Notice: Subject to any disclaimer, the term of this patent is extended or adjusted under 35 U.S.C. 154(b) by 389 days.

(21) Appl. No.: 13/058,744

(22) PCT Filed: Jul. 17, 2009

(86) PCT No.: PCT/EP2009/005228
§ 371 (c)(1),
(2), (4) Date: Feb. 11, 2011

(87) PCT Pub. No.: WO2010/017872
PCT Pub. Date: Feb. 18, 2010

(65) Prior Publication Data
US 2011/0144798 A1 Jun. 16, 2011

(30) Foreign Application Priority Data
Aug. 14, 2008 (DE) .......................... 10 2008 037 658

(51) Int. Cl.
*G06F 7/00* (2006.01)
*B65G 1/00* (2006.01)

(52) U.S. Cl.
USPC ........... 700/218; 700/213; 700/214; 700/216; 700/219; 700/228; 700/230

(58) Field of Classification Search
None
See application file for complete search history.

(56) References Cited

U.S. PATENT DOCUMENTS

| 6,971,833 | B1 * | 12/2005 | Freudelsperger et al. | ..... 414/276 |
| 2002/0131849 | A1 * | 9/2002 | Hatanaka | ....................... 414/281 |
| 2005/0074315 | A1 * | 4/2005 | Freudelsperger | ............. 414/278 |
| 2008/0269960 | A1 * | 10/2008 | Kostmann | ......................... 701/2 |

FOREIGN PATENT DOCUMENTS

| AT | 403156 B | * 10/1997 |
| AT | 403 156 B | 11/1997 |
| DE | 89 07 478 U1 | 8/1989 |
| WO | WO 20051184361 A1 | 12/2005 |

* cited by examiner

Primary Examiner — Yolanda Jones
(74) Attorney, Agent, or Firm — McGlew and Tuttle, P.C.

(57) ABSTRACT

A method and an apparatus for the order picking of items in an order-picking installation (30) with an automatic order-picking device (31) and an associated dynamic-storage rack (1) as a store for replenishing the automatic order-picking device with items. The items are automatically transported, preferably separately according to type, in containers or boxes (2) to the dynamic-storage rack (1) on a driven conveying line (4). After reading and identifying the boxes (2), they are introduced automatically by an activated stationary lift (5) and activated level serving devices (6) of the dynamic-storage rack (1) into selected dynamic-storage channels (3) of the dynamic-storage rack. The channels have exits (A) that can be manually reached by an operator (17). After manual removal of the containers/boxes (2) at a selected exit (A) of a dynamic-storage channel (3), and then unpacking of the containers/boxes by the operator, the items are introduced, separately according to type, into order-picking compartments of the automatic order-picking device (31), in order to replenish order-picking device (31).

22 Claims, 6 Drawing Sheets

PROCESS AND DEVICE FOR COMMISSIONING INDIVIDUALLY PACKAGED PRODUCTS WITH AN AUTOMATIC COMMISSIONING UNIT AND A CO-ORDINATE FLOW SHELF

CROSS REFERENCE TO RELATED APPLICATIONS

This application is a United States National Phase application of International Application PCT/EP2009/005228 filed Jul. 17, 2009 and claims the benefit of priority under 35 U.S.C. §119 of DE 10 2008 037 658.2 filed Aug. 14, 2008, the entire contents of which are incorporated herein by reference.

FIELD OF THE INVENTION

The present invention pertains to a process and a device for commissioning individually packaged products with an automatic commissioning unit and coordinate flow shelf as a reserve for refilling the automatic commissioning unit with individually packaged products.

BACKGROUND OF THE INVENTION

It is state of the art to store products, which shall be introduced into the vertical or nearly vertical product shafts of the automatic commissioning unit, on the rear side of an automatic commissioning unit. The storage may take place, for example, in static bays.

If it is necessary to store and refill larger quantities of products, flow shelves are used. The products are filled in original cardboard boxes on the rear side into the flow shelf. The cardboard boxes are opened on the front side when needed and individual products are filled into the automatic commissioning unit.

There also are solutions in which the filling of the throughput channels is performed by a two-dimensionally movable bay storage and retrieval unit, which is guided on rails and is longitudinally displaceable and at the same time adjustable in height in order to introduce products into a bay. The products are introduced here first onto a parking space in the bay storage and retrieval unit and pushed into the flow shelf when needed.

The solution based on a bay storage and retrieval unit for automatic filling has a number of drawbacks:

The possibility of retrofitting is almost always nonexistent because the buildings are too low in the area of the automatic units, and the ceilings have a load-bearing capacity that is too low for a high bay.

The throughput of a bay storage and retrieval unit is in many cases insufficient to transfer the desired quantity of products from parking spaces into the throughput channels.

Solutions with bay storage and retrieval units have to rely on the storage of a standard container. At least the width must be equal (e.g., 1 cardboard box of 600×400 or two cardboard boxes of 300×400).

All products in the flow shelves must be first introduced into the bay.

The energy consumption and the electric connected loads of a bay storage and retrieval unit are so high that the electric supply lines are often insufficient.

SUMMARY OF THE INVENTION

Based on the above-described state of the art, the object of the present invention is to improve a process and a device for refilling a flow shelf of the class mentioned in the introduction, which is arranged upstream of the automatic commissioning unit, such that the flow shelf, while having a simple design, can be filled rapidly and effectively with containers/cardboard boxes containing individually packaged products and the individually packaged products can be ergonomically introduced into the automatic commissioning unit.

The essence of the present invention is that the individually packaged products are transported automatically in containers or cardboard boxes to the flow shelf preferably such they are all of the same kind and after reading and recognition, they are automatically introduced into selected throughput channels of the flow shelf with outlets that can be reached by a human operator by hand via an activated stationary elevator and activated level control units of the flow shelf, and after manually removing the containers/cardboard boxes at a selected outlet of a throughput channel and unpacking of the containers/cardboard boxes by the human operator, the individually packaged products are introduced into commissioning shafts of the automatic commissioning unit, which said shafts are to be refilled, in such a way that they are all of the same kind.

Besides filling the throughput channels in such a way that the products are all of the same kind, mixed filling is also advantageous for very slowly moving products.

Containers/cardboard boxes of different widths in the level control unit are preferably aligned here by adjusting means on one container side and introduced into selected throughput channels, whose width corresponds to the width of the containers/cardboard boxes.

A device according to the present invention for refilling the flow shelf is characterized by at least one driven conveying section preferably in the form of an accumulating roller conveyor and at least one flow shelf with sloped throughput channels in a plurality of bay levels, preferably three to five bay levels, whose outlets can be reached by a human operator. The flow shelf has a displaceable, track-guided level control unit each in each bay level for automatically filling the throughput channels with containers/cardboard boxes, which contain individually packaged products that are all of the same kind. Furthermore, the flow shelf has at least one stationary elevator connected to the conveying section for automatic transport of the containers/cardboard boxes from the conveying section into each selected bay level. Finally, the flow shelf comprises a buffer section in each bay level connected to the elevator for automatically taking over the containers/cardboard boxes from the elevator, whose outlet can be automatically approached by the level control unit, wherein the level control unit can take over a container/cardboard box each for horizontal transportation to the inlet of a selected throughput channel.

The level control units are preferably guided as horizontal braces of the flow shelf, which are designed as rails.

The flow shelf has mostly only one-sided throughput channels.

The flow shelf may also be designed as a double bay, and the level control/conveyor units are horizontally displaceable in a central bay aisle of the double bay and can be positioned at the outlets of the buffer section and at the inlets of opposite throughput channels.

The level control unit has a load pickup/carrying means with drivable rollers, whose axes extend in the direction of travel of the level control unit and at right angles to the throughput channels.

In the area of the axial ends of the rollers, the load pickup means has a stationary lateral railing each at right angles to the direction of travel.

The distance between the two lateral railings can preferably be set and corresponds especially to the width of a container/cardboard box and is adjustable as an adjusting means of at least one of the two railings.

The level control unit can be positioned at the inlets of throughput channels having different widths, the distance between the two railings always being set to the width of the flow shelf activated.

The conveying section preferably has a recognition means for recognizing a fed container/cardboard box and for transmitting the data of the container to a central computer, which brings about fully automatic operation of feeding the containers/cardboard boxes along with sorting in the throughput channels.

The level control unit is also equipped with at least one sensor for recognizing the state of filling of a throughput channel.

The conveying section is preferably arranged overhead in order to make unhindered access to the flow shelf and to the automatic commissioning unit possible.

The conveying section may also have a connection section for at least one adjacent flow shelf.

The flow shelf is composed especially of a plurality of bay modules, which are located one after another and in the direction of travel of the level control units.

Consequently, the products are fed to the flow shelf due to the present invention via a stationary elevator and lightweight, displaceable level control units of a simple design in each bay level. The stationary elevator of a simple design has an adjusting platform preferably for only one container. It was found that the use of an elevator is advantageous even in flow shelves of a small overall height, which are not high bays, and can be reached by a human operator by hand at the outlet. The possibility of expansion is also advantageous, because the system can grow together with the automatic commissioning units. The existing level control units can also approach and service the additional bay modules. The throughput channels need no control instruments such as sensors or reflectors for checking the filling level, because the control instruments are arranged displaceably and on the level control units that are present anyway.

The present invention offers various advantages over the state of the art mentioned in the introduction:

The area load and space requirement correspond to the existing flow shelves, as a result of which simple retrofitting is possible.

The throughput of the flow shelf according to the present invention with integrated elevator and bay storage and retrieval units in each bay level is approximately four times that in a conventional solution based on bay storage and retrieval unit without elevator and without separate level control units in each bay level. As a result, nearly all requirements on throughput can be met. Products that are too fast for the system according to the present invention are filled, in general, directly from a pallet into the automatic unit.

Due to the fact that the products do not have to be introduced into a bay, but are brought up to the throughput channel on a roller conveyor (the level control unit and elevator represent each a roller conveyor mechanism permitting displacement over a short section), there are no restrictions in terms of geometry as long as the product can be transported on the conveying mechanism.

The energy demand of the system is very low due to the small moving masses of the compact level control units. The electric connected loads equal only about 10% of the values that are necessary for a conventional large, displaceable bay storage and retrieval unit with integrated elevator.

Since the products move to the flow shelf according to the present invention on a conveyor, they may come from any desired site within the warehouse, e.g., directly from receiving, from a manual pallet warehouse or from an automatic high-shelf storage area.

Further advantages are:

The area of the level control units is also walkable in a simple manner even in case of two-sided arrangement of the throughput channels.

Simplicity of design/cost savings.

The number of components is small. The maintenance effort is also low as a result.

The checking to determine whether the throughput channel is full does not have to be arranged per throughput channel any longer, but it is carried along centrally at the level control unit.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
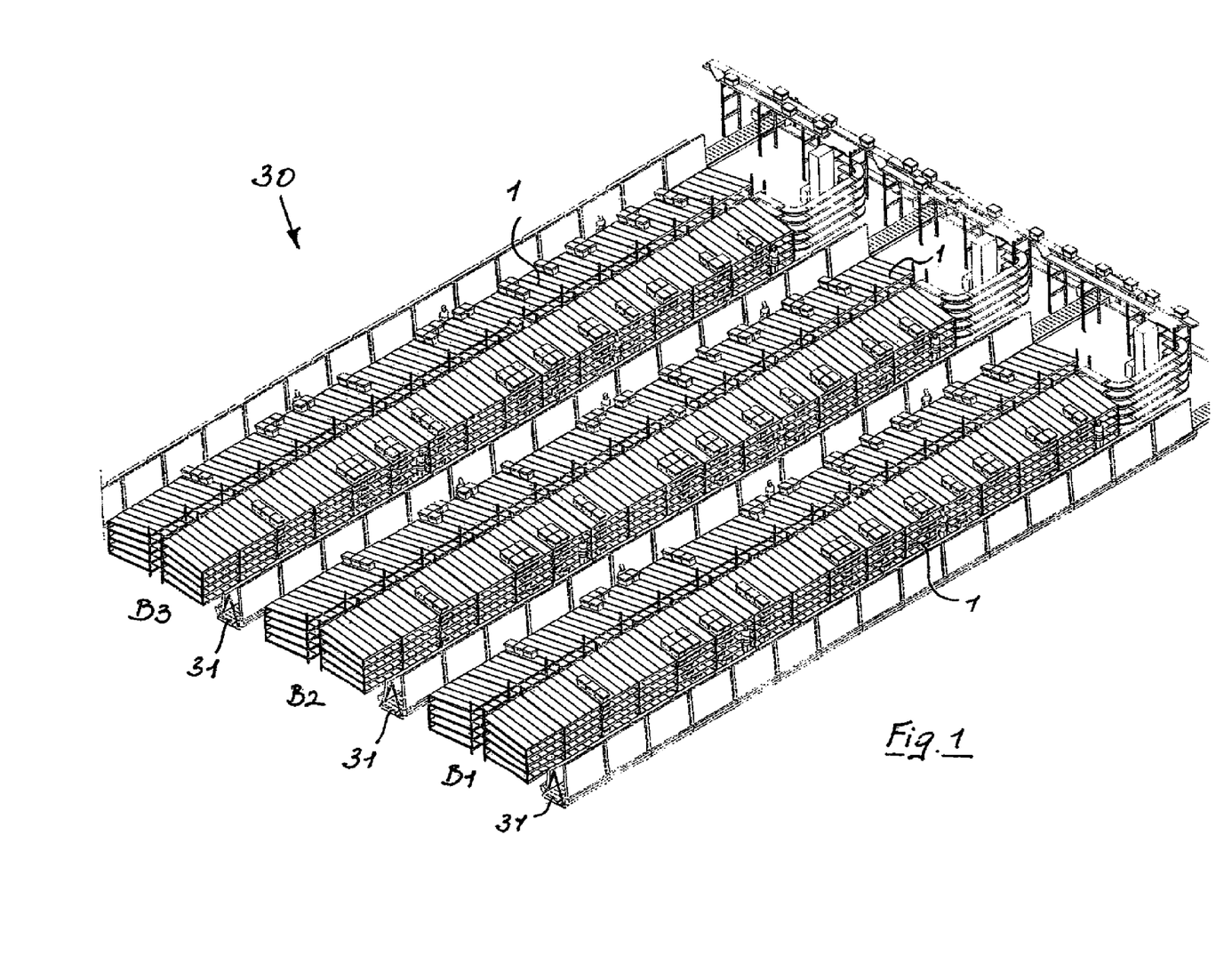
FIG. 1 is a commissioning unit with a plurality of blocks of automatic commissioning units and coordinate flow shelves along with conveying sections according to the present invention as seen in a schematic perspective view from the rear.
Figure 2:
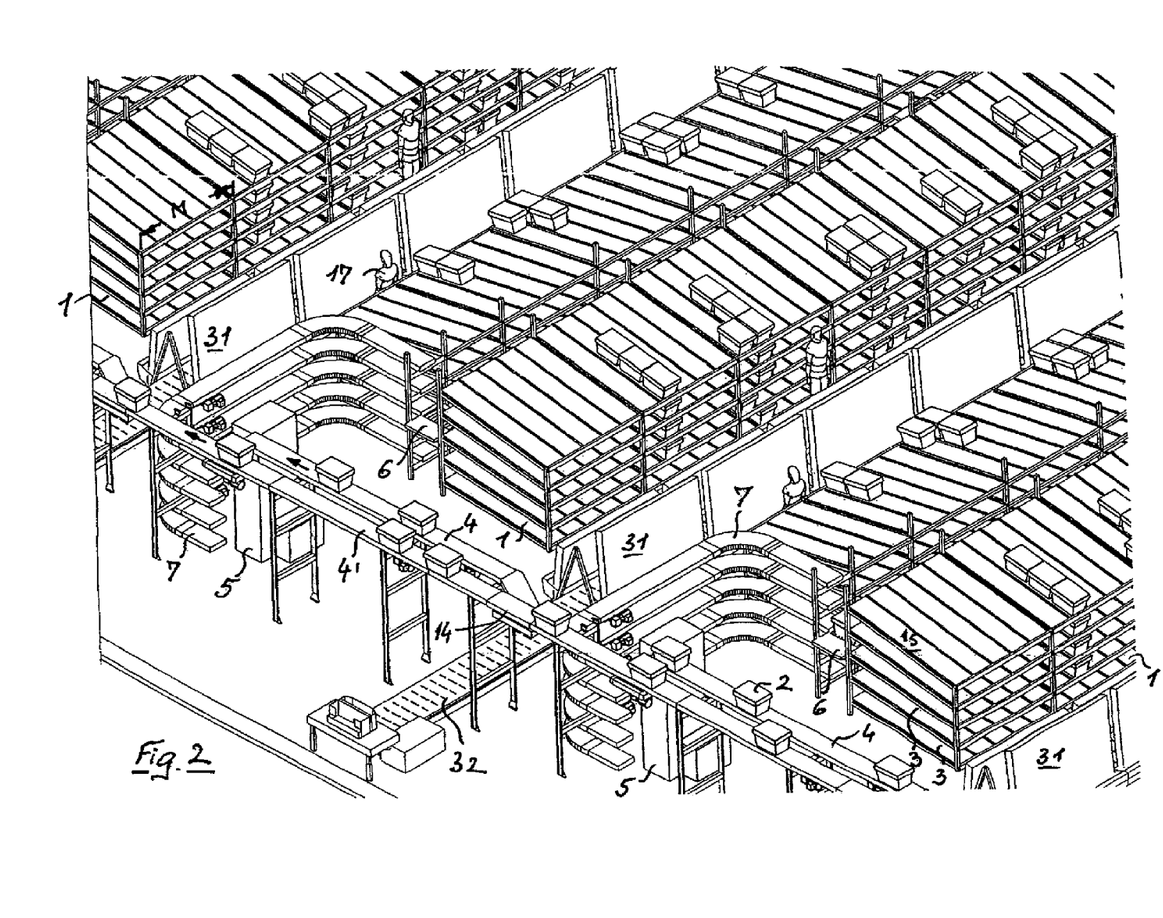
FIG. 2 is the commissioning unit according to FIG. 1 in a larger detail in a schematic perspective view from the front, as viewed from the conveyor conveying section.
Figure 3:
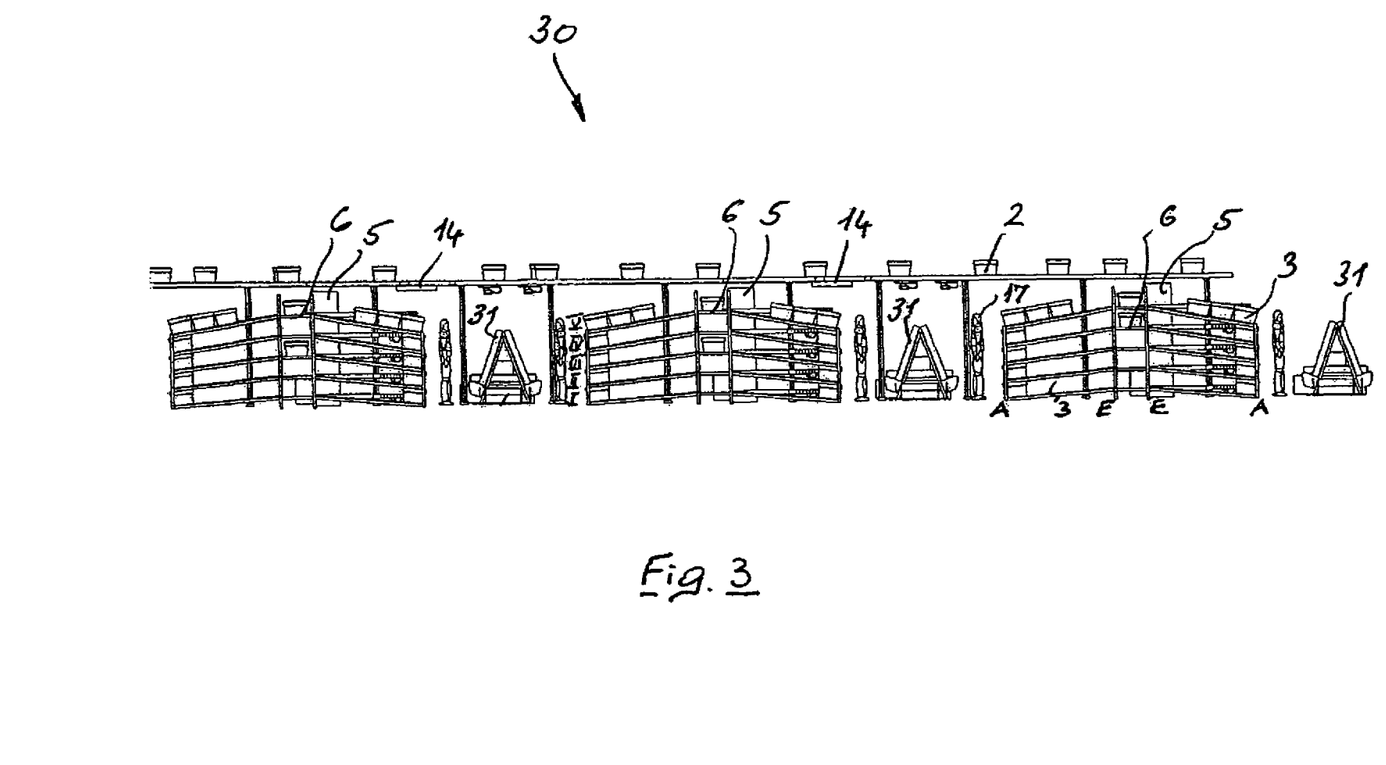
FIG. 3 is the commissioning unit according to FIGS. 1 and 2 in a schematic side view from the rear.
Figure 4:
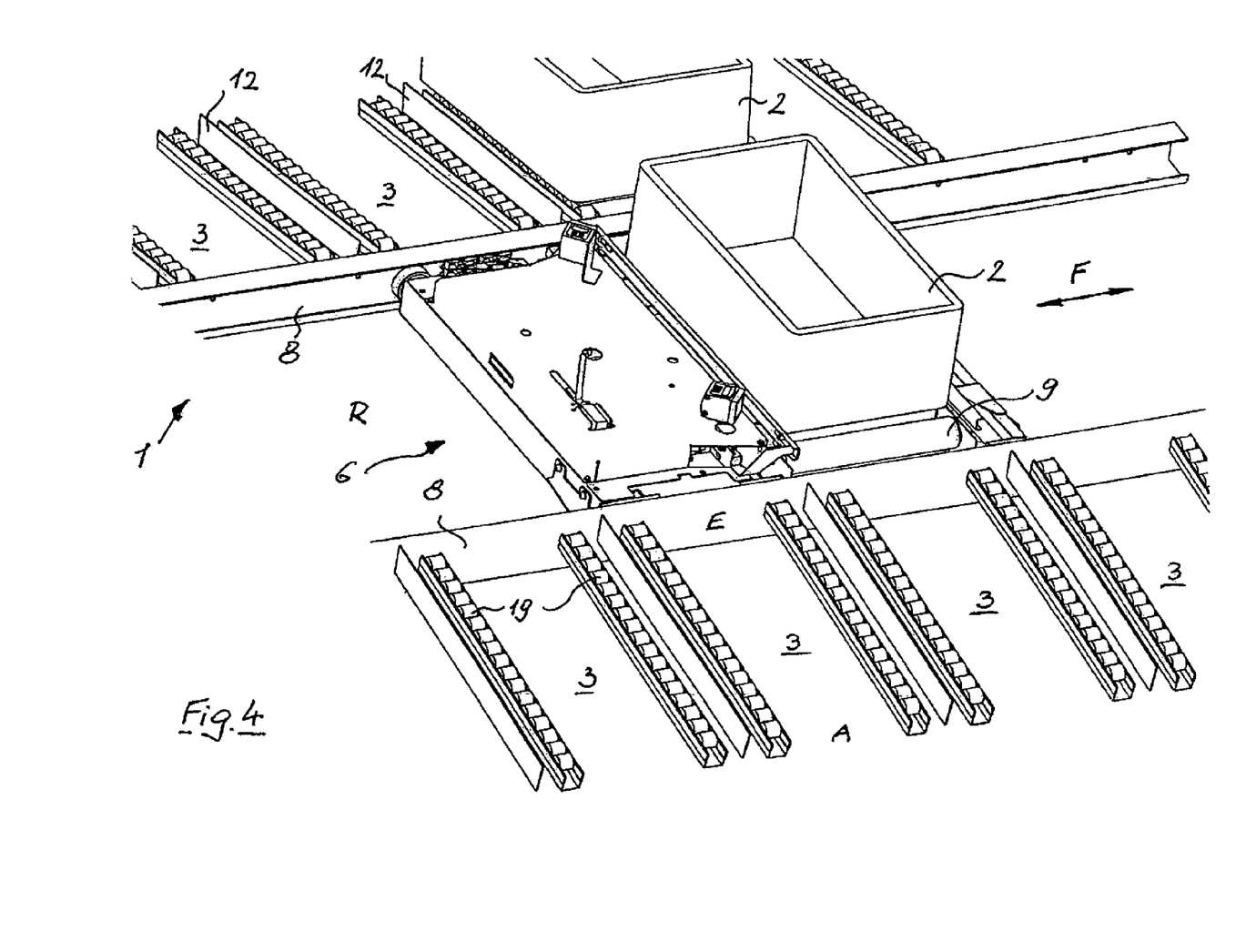
FIG. 4 is a detailed view of a rack/bay plane of a flow shelf with a level control unit.
Figure 5:
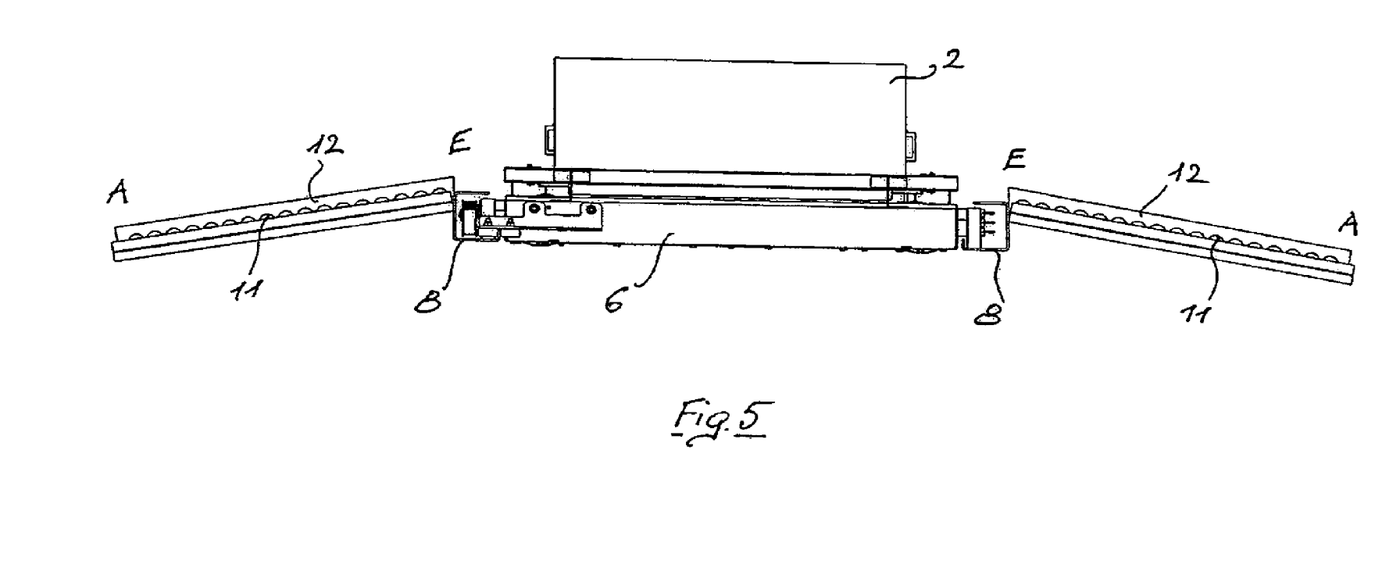
FIG. 5 is a detailed view of the rack/bay plane according to FIG. 4 schematically from the front with a container omitted.
Figures 6, 7, 8:
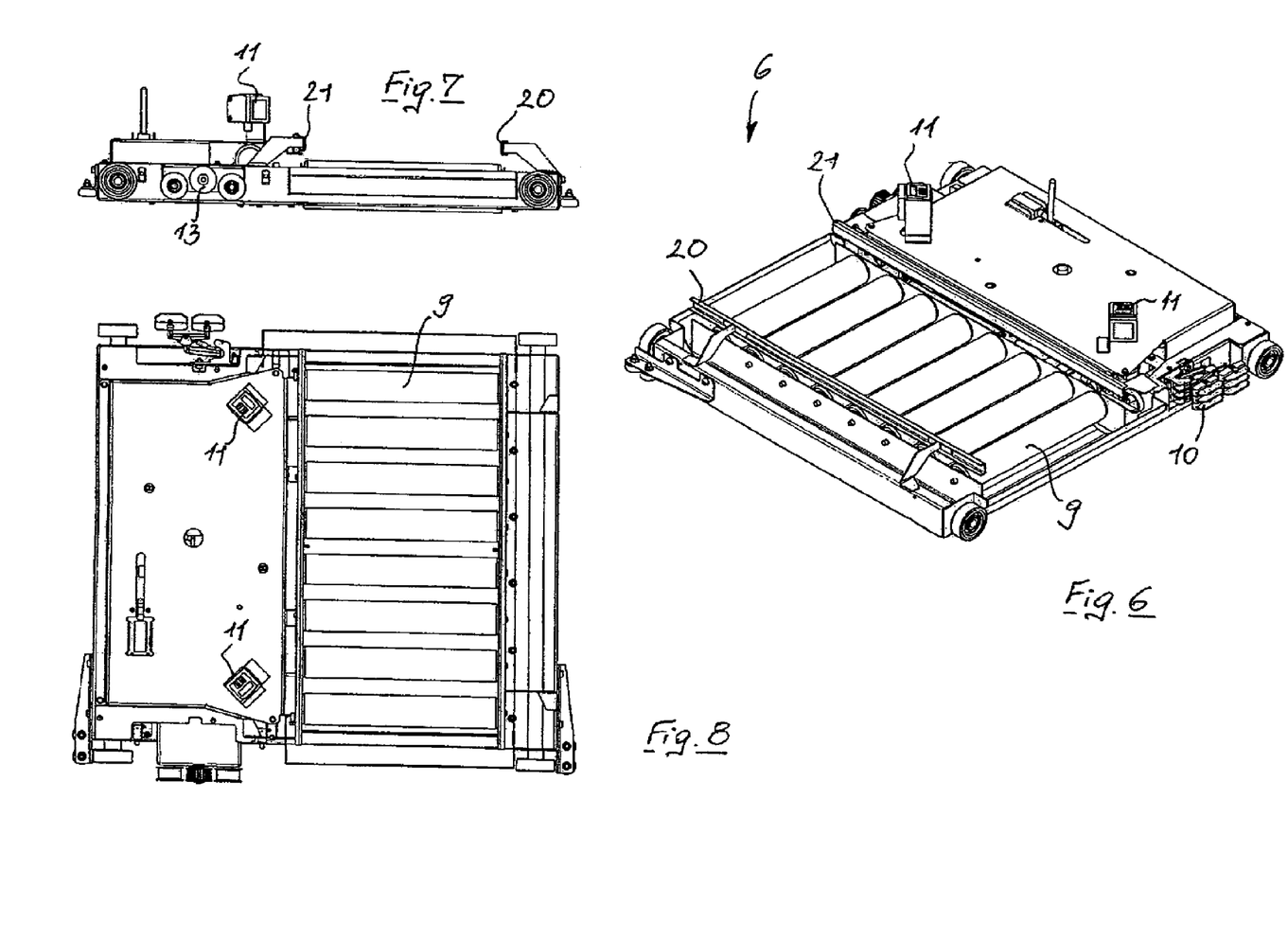
FIG. 6 is the level control unit according to FIG. 4 in a perspective view.
FIG. 7 is the level control unit according to FIG. 4 in a side view.
FIG. 8 is the level control unit according to FIG. 4 in a top view.

Referring to the drawings in particular, FIGS. 1, 2 and 3 schematically show a commissioning unit 30 for commissioning individually packaged products with automatic commissioning units 31 along with associated central belts 32 and coordinate flow shelves 1 as a reserve for filling the automatic commissioning unit with individually packaged products in a plurality of blocks B1, B2, B3.

The individually packaged products are transported automatically to a flow shelf 1 in containers or cardboard boxes 2 in each block B1, B2, B3 on a driven conveying section, or a container feed section, 4. The individually packaged products in containers or cardboard boxes 2 are transported each in such a way that they are all of the same kind, and after reading and recognition, they are automatically introduced via an activated stationary elevator 5 and activated level control units 6 of the flow shelf 1 into selected throughput channels or ramps 3 of the flow shelf with outlets A that can be reached by a human operator 17 by hand.

Mixed filling of the containers or cardboard boxes 2, in which case the individually packaged products are not consequently introduced such that they are all of the same kind, is advantageous for very slowly moving individually packaged products.

After manual removal of the containers/cardboard boxes 2 at a selected outlet A of a throughput channel 3 and unpacking of the containers/cardboard boxes by a human operator 17, the individually packaged products are introduced into commissioning shafts of the automatic commissioning units 31. These shafts are to be refilled, in such a way that they are all of the same kind.

In particular, each block B1, B2, B3 includes a driven conveying section 4 in the form of an accumulating roller conveyor, as well as a flow shelf 1 with sloped throughput channels 3 in a plurality of bay levels I, II, III, IV, V, preferably three to five bay levels, whose outlets A can be reached by a human operator 17.

The flow shelf 1 contains a displaceable, track-guided level control or conveyor unit 6 in each bay level I, II, III, IV, V for automatically filling the throughput channels 3 with containers/cardboard boxes 2, which contain individually packaged products that are all of the same kind.

Furthermore, the flow shelf 1 has a stationary elevator 5 connected to the conveying section 4 for the automatic transport of the containers/cardboard boxes 2 from the conveying section 4 into each selected bay level I, II, III, IV, V.

The flow shelf 1 also has a buffer section 7 each in each bay level I, II, III, IV, V connected to the elevator 5 for an automatic takeover of the containers/cardboard boxes 2 from the elevator. Each buffer section 7 has an outlet that can be automatically approached by the level control or conveyor unit 6, wherein said level control unit can take over a container/cardboard box 2 for horizontal transportation to the inlet E of a selected throughput channel 3.

The level control/conveyor units 6 are guided by guide rollers in horizontal braces of the flow shelf 1, designed as rails 8.

In particular, the flow shelf 1 is designed as a double bay, and the level control units 6 can be displaced horizontally in the direction of travel F in a central bay aisle R of the double bay and are positioned at the outlets of the buffer section and at the inlets E of opposite throughput channels 3.

The level control unit 6 has a load pickup or carrying means with drivable rollers 9, whose axes extend in the direction of travel F of the level control unit 6 and at right angles to the throughput channels 3, as this can be seen especially in FIGS. 4 through 8.

The load pickup/carrying means has, in the area of the axial ends of the rollers 9, a stationary lateral railing 20, 21 each at right angles to the direction of travel F.

The distance between the two lateral railings 20, 21 can be set, and the distance set corresponds to the width of a container/cardboard box 2. Only the front railing 20 is provided in the exemplary embodiment as an adjusting means, which is located at the edge of the level control unit. The two lateral railings 20, 21 extend at right angles to the direction of travel F.

The level control unit 6 may be positioned at the inlets E of throughput channels 3 having different widths, and the distance between the two railings 20, 21 is always set to the width of the activated throughput channel 3.

The level control unit 6 has, furthermore, an electric drive 13, which is preferably connected to a stationary conductor rail via sliding contacts 10.

The electric drive 13 has a shaft encoder, with which the distance traveled by the level control unit 6 can be measured.

The level control unit 6 is equipped with two sensors 11 for recognizing the state of filling of a throughput channel 3.

Conveying section 4 has a recognition means for recognizing a fed container/cardboard box 2 and for transmitting the data of the container to a central computer, which brings about fully automatic operation of the feeding of the containers/cardboard boxes along with sorting in the throughput channels 3.

The conveying section 4 is arranged overhead and makes possible free passage to the commissioning bay as well as the flow shelf.

The conveying section 4 has a connection section 4' for adjacent flow shelves according to FIG. 1. The flow shelves 1 are provided in a parallel arrangement.

Each flow shelf 1 is composed of a plurality of bay modules M, which are located one after another and in the direction of travel F of the level control units 6.

The throughput channels 3 have a short longitudinal extension and have two lateral roller strips 19, and adjacent throughput channels 3 are separated from each other by separating webs 12.

A throughput channels for rejects 15 is provided in the area of the buffer sections, in which damaged or unidentified containers/cardboard boxes 2 are sorted out and further processed separately.

The level control unit 6 consequently has rollers 9 as load pickup/carrying means. The rollers 9 are driven and can pick up and release a container/cardboard box 2 at right angles to the direction of travel F.

The level control unit 6 travels on running rails 8. The level control unit is driven in the embodiment variant described with a so-called omega drive according to FIG. 7 along a fixed toothed belt. The toothed belt runs as in an omega around the drive roller. The motor of the level control unit has a shaft encoder, with which the distance traveled can be measured. The level control unit thus knows its position and can be positioned in front of the desired throughput channel. The drive may, in principle, also be designed as a frictionally engaged drive with wheels. The level control unit is held by guide rollers in a fixed position in relation to the flow shelf, because the rails 8 are part of the flow shelf.

By switching on the rollers, the level control unit can pick up containers/cardboard boxes 2 from the conveying means and release same into the throughput channels 3. A throughput channel 3 is formed from two or more roller strips 19 and limited by separating webs 12.

The level control unit 6 is equipped with sensors 11, which makes it possible to recognize whether a throughput channel 3 can still take up a container/cardboard box 2 or the throughput channel is full. This can be performed with a sensor 11, which is able to measure the distance from the next obstacle (e.g., optically or with ultrasound). However, a reflector may also be arranged per ramp, and a photoelectric cell checks whether the path to the reflector is clear. If the photoelectric cell sees the reflector, the channel is clear.

Sensor 11 may also be used to check whether a container/cardboard box 2 was released correctly into the throughput channel 3.

In case of containers 2 of different widths and throughput channels adapted to the width, the container/cardboard box 2 must be aligned at a defined edge. This is the front edge 20 of the level control unit 6 in this case. The alignment at the railing can be carried out by the container/cardboard box being taken over already in the aligned position from the conveying mechanism in another embodiment variant. However, provisions are primarily made for the railing 20 to be designed as a displaceable railing in order to obtain the desired alignment. Simultaneous measurement of the product width is also possible with the displaceable railing 20. Deviations between the channel width and the product width can be recognized as a result.

The elevator may be equipped with different elevator platforms. The platform has a single depth in the simplest variant, i.e., only one container/cardboard box 2 can be carried per trip. It is also possible, in principle, to build platforms of double or multiple depth in order to make it possible to transport a plurality of containers/cardboard boxes per trip. Depending on the arrangement of the conveyor mechanism, the elevator may operate as a so-called C conveyor or S conveyor. "C" means that the container/cardboard box describes a "C," i.e., the container/cardboard box enters in one direction and leaves in another direction. In an "S," the container/cardboard box moves away from the elevator in the same direction.

While specific embodiments of the invention have been described in detail to illustrate the application of the principles of the invention, it will be understood that the invention may be embodied otherwise without departing from such principles.

The invention claimed is:

1. A process for commissioning individually packaged products, the process comprising the steps of:
   providing a plurality of containers with a plurality of the individually packaged products packed into the plurality of containers;
   providing a driven conveying section and an elevator;
   transporting the plurality of containers along the driven conveying section to the elevator;
   providing a plurality of channels receiving and guiding the containers, said plurality of channels being arranged in a plurality of levels, each of said levels including a plurality of said channels arranged in a horizontal direction, said each of said levels being arranged in a vertical direction, each of said plurality of channels having an inlet and an outlet;
   selectively moving the elevator with one of the plurality of containers to one of said plurality of levels;
   providing a plurality of level conveyor units, each of said level conveyor units being arranged at a different one of said plurality of levels of said channels;
   selectively moving the containers from the elevator to one of the level conveyor units;
   selectively conveying the containers from the elevator to said inlets of said channels in a respective said level on a respective level conveyor unit;
   moving the containers from the inlets of the channels to the outlets of the channels;
   removing the containers from the outlets of the channels by a human operator;
   providing an automatic commissioning unit with a plurality of commissioning shafts;
   unpacking the containers by a human operator at at least said outlet of one of said throughput channels, and moving the unpacked individually packaged products selectively into the commissioning shafts of the automatic commissioning unit, to have each of the commissioning shafts filled with all of the same kind of individually packaged products after removal of the containers manually at said outlet of one of said throughput channels and unpacking of the containers by the human operator, wherein containers of different widths are aligned in the level control unit by adjusting means on one side of the container and introduced into selected throughput channels, wherein a width of said selected throughput channels corresponds to a width of the containers.

2. A commissioning process in accordance with claim 1, wherein:
   the plurality of containers have a plurality of different widths;
   the plurality of channels have a plurality of different widths;
   the level conveyor unit aligns the different widths of the containers with a corresponding width of the channels.

3. A commissioning unit with a plurality of containers, the commissioning unit comprising:
   a plurality of flow shelves, each of said flow shelves comprising a plurality of horizontally extending rails and a plurality of channels arranged next to each other and one on top of another, wherein said channels being arranged next to each other form one of a plurality of levels of one of flow shelves, each of said channels having an inlet and an outlet, said outlets being arranged to be reached by a human operator by hand;
   a separate, rail-guided level conveyor unit is arranged at each of said plurality of levels, each said level conveyor unit being mounted to one of said horizontally extending rails of one of said plurality of flow shelves and to another one of said horizontally extending rails of another one of said plurality of flow shelves such that each said level conveyor unit is displaceable at right angles to said inlets of respective said channels, said each conveyor unit transporting a container to a selected said ramp and filling said selected ramp with the fed container, said each level conveyor unit having an adjusting means for aligning containers of different widths on the level control unit, said adjusting means comprising at least one rail, said at least one rail extending substantially perpendicular to said one of said horizontally extending rails of said one of said plurality of flow shelves and said another one of said horizontally extending rails of said another one of said plurality of flow shelves;
   a separate buffer section arranged upstream of each of said level conveyor units in each of said plurality of levels, each said buffer section having an outlet, said each level conveyor unit being positioned for taking over a container from a respective said buffer section of a respective said level;
   an elevator selectively conveying a container into one of said buffer units of said plurality of levels;
   a conveying section feeding the plurality of containers to said elevator;
   an automatic commissioning unit with a plurality of commissioning shafts arranged opposite from, and spaced from, said outlets of said plurality of channels, each of said commissioning shafts being arranged to be filled with the same type of products.

4. A commissioning unit in accordance with claim 3, wherein:
   said flow shelf has said channels arranged to be one-sided;
   said level conveyor units are horizontally displaceable on said inlet side of said channels.

5. A commissioning unit in accordance with claim 3, wherein:

said channels are arranged to form a double bay with a central bay aisle;

said level conveyor units are horizontally displaceable in said central bay aisle of said double bay and can be positioned at said outlets of said buffer sections and at said inlets of opposite said channels.

6. A commissioning unit in accordance with claim 3, wherein:

said level conveyor unit has a load pickup means.

7. A commissioning unit in accordance with claim 6, wherein:

said load pickup means includes a plurality of drivable rollers, whose axes extend in a direction of travel of a respective said level conveyor unit and at right angles to said channels and at right angles to said one of said horizontally extending rails of said one of said plurality of flow shelves and said another one of said horizontally extending rails of said another one of said plurality of flow shelves.

8. A commissioning unit in accordance with claim 6, wherein:

said load pickup means is formed by one of a conveyor belt, and a plurality of round or toothed belts.

9. A commissioning unit in accordance with claim 6, wherein:

said load pickup means has a stationary lateral railing at right angles to a direction of travel of said level conveyor unit.

10. A commissioning unit in accordance with claim 6, wherein:

said level conveyor unit has another rail at right angles to a direction of travel of said level conveyor unit and said one of said horizontally extending rails of said one of said plurality of flow shelves and said another one of said horizontally extending rails of said another one of said plurality of flow shelves, at least one of said two rails being adjustable relative to said level conveyor unit.

11. A commissioning unit in accordance with claim 10, wherein:

said channels have different widths;

said level conveyor unit is positionable at said inlets of said channels having different widths, said distance between said two rails being selectively adjustable to a respective said width of said ramp to be serviced.

12. A commissioning unit in accordance with claim 3, wherein:

said level conveyor unit includes an electric drive, which is connected to a stationary electrical conductor rail via sliding contacts.

13. A commissioning unit in accordance with claim 12, wherein:

said electric drive has a shaft encoder measuring a distance traveled by said level conveyor unit.

14. A commissioning unit in accordance with claim 3, wherein:

said level conveyor unit includes a sensor recognizing a state of filling of said channels.

15. A commissioning unit in accordance with claim 3, wherein:

said conveying section includes recognition means for recognizing a fed container and for transmitting data of the container to a central computer, which brings about a fully automatic feeding and sorting operation of the containers into said channels.

16. A commissioning unit in accordance with claim 3, wherein:

said conveying section is arranged overhead.

17. A commissioning unit in accordance with claim 3, wherein:

said conveying section has a connection section for feeding an adjacent flow shelf.

18. A commissioning unit in accordance with claim 3, wherein:

said channels are arranged to form a plurality of flow shelves in a parallel arrangement.

19. A commissioning unit in accordance with claim 3, wherein:

said plurality of channels are arranged into a plurality of bay modules, which are located one after another and are in a direction of travel of said level conveyor units.

20. A commissioning unit in accordance with claim 3, wherein:

said channels included lateral roller strips;

separating webs are arranged between adjacent said channels of one level.

21. A commissioning unit in accordance with claim 3, wherein:

one of said channels is reserved for rejected containers.

22. A process for commissioning individually packaged products, the process comprising the steps of:

providing a plurality of containers with a plurality of the individually packaged products packed into the plurality of containers;

providing a driven conveying section and an elevator;

transporting the plurality of containers along the driven conveying section to the elevator;

providing at least a plurality of flow shelves, each of said flow shelves comprising at least one horizontally extending rail and a plurality of channels receiving and guiding the containers, said plurality of channels being arranged in a plurality of levels, each of said levels including a plurality of said channels arranged in a horizontal direction, said each of said levels being arranged in a vertical direction, each of said plurality of channels having an inlet and an outlet;

moving the elevator with at least one of the containers to one of said plurality of levels;

providing a plurality of level conveyor units, each of said level conveyor units being arranged at a different one of said plurality of levels of said channels, each of said level conveyor units being movably mounted to said horizontally extending rail of one of said flow shelves and said horizontally extending rail of another one of said flow shelves, wherein each of said level conveyor units is arranged between said one of said flow shelves and said another one of said flow shelves, wherein each of said level conveyor units is movable relative to said flow shelves, each said level conveyor units having an adjusting means for aligning a container on the level control unit, said adjusting means comprising at least one rail, said at least one rail being arranged on one side of the container, wherein said at least one rail defining a width corresponding to a width of the container, said at least one rail being essentially perpendicular to said horizontally extending rail of one of said flow shelves and said horizontally extending rail of another one of said flow shelves;

moving said at least one of said containers to one of the level conveyor units;

moving said one of said level conveyor units with said at least one of said containers arranged thereon in said horizontal direction, parallel to said horizontally extending rail of one of said flow shelves and said horizontally extending rail of another one of said flow shelves, to said inlet of one of said channels in a respective said level;

moving the containers from the inlets of the channels to the outlets of the channels;

removing the containers from the outlets of the channels by a human operator;

providing an automatic commissioning unit with a plurality of commissioning shafts;

unpacking the containers by a human operator, and moving the unpacked individually packaged products selectively into the commissioning shafts of the automatic commissioning unit, to have each of the commissioning shafts filled with all of the same kind of individually packaged products after removal of the containers manually at said outlet of one of said throughput channels and unpacking of the containers by the human operator.

* * * * *